US007597218B2

(12) United States Patent
Workum

(10) Patent No.: US 7,597,218 B2
(45) Date of Patent: Oct. 6, 2009

(54) PUMP WITH MECHANICAL MEANS FOR EFFECTIVE PRIMING AND DRIP PREVENTION

(75) Inventor: Donald Jan Workum, Zug (CH)

(73) Assignee: Wordon GmbH, Zug (CH)

( * ) Notice: Subject to any disclaimer, the term of this patent is extended or adjusted under 35 U.S.C. 154(b) by 512 days.

(21) Appl. No.: 10/543,993

(22) PCT Filed: Feb. 3, 2004

(86) PCT No.: PCT/IB2004/000698

§ 371 (c)(1),
(2), (4) Date: Apr. 28, 2006

(87) PCT Pub. No.: WO2004/071673

PCT Pub. Date: Aug. 26, 2004

(65) Prior Publication Data

US 2006/0237484 A1 Oct. 26, 2006

(30) Foreign Application Priority Data

Feb. 14, 2003 (GB) ................................ 0303357.8

(51) Int. Cl.
*G01F 11/00* (2006.01)

(52) U.S. Cl. ................................ 222/321.8; 222/321.3

(58) Field of Classification Search ............. 222/321.3, 222/321.8, 321.7, 321.9, 372, 378, 477
See application file for complete search history.

(56) References Cited

U.S. PATENT DOCUMENTS 4,147,476 A * 4/1979 Warren .................... 222/321.2
5,192,006 A 3/1993 Van Brocklin et al.
5,228,600 A 7/1993 Steijns et al.
5,518,377 A * 5/1996 Bougamont et al. ...... 222/321.3
6,065,647 A * 5/2000 Bliss et al. ............... 222/321.9

FOREIGN PATENT DOCUMENTS

| | | |
|---|---|---|
| DE | 2513 766 | 10/1975 |
| EP | 0795 354 | 9/1997 |
| EP | 0894 539 | 2/1999 |
| FR | 2742487 | 6/1997 |

OTHER PUBLICATIONS

International Search Report and Written Opinion dated Jul. 1, 2004.

* cited by examiner

*Primary Examiner*—Kevin P Shaver
*Assistant Examiner*—Jonathan Wood
(74) *Attorney, Agent, or Firm*—Jenkins, Wilson, Taylor & Hunt, P.A.

(57) ABSTRACT

A dispensing device comprising pump for dispensing liquid, the pump comprising a hollow piston moveable within a cylinder, and a valve, controlling the supply of liquid to the piston/cylinder. During a first phase of operation the piston moves outwardly within the cylinder while the valve permits the supply of liquid into the chamber and during a second, subsequent, phase of operation the piston moves inwardly within the cylinder while the valve shuts off the supply of flowable material, with the result that liquid drawn into the chamber during the first phase is pressurized. Arrangements for effective priming and pre-compression of liquid are also described.

7 Claims, 7 Drawing Sheets

PUMP WITH MECHANICAL MEANS FOR EFFECTIVE PRIMING AND DRIP PREVENTION

DESCRIPTION

TECHNICAL FIELD

The present invention relates to pumps, in particular manually actuated pumps. The present invention further relates to a method of delivering a flowable material using a pump.

BACKGROUND ART

Pumps suitable for spraying or otherwise delivering liquid from a container when manually actuated by a user are widely used in the fields of cosmetics and household cleaning products. Typically the pump is mounted on the container and communicates with the liquid by means of a dip tube. When actuated by a user, the pump draws liquid from the container through the dip tube and into the pump body; and then impels liquid from the pump body to an outlet.

Various arrangements of pump, outlet and means for user actuation can be used depending on the properties of the liquid to be delivered, desired outlet flow conditions and cost. For example, trigger spray pumps such as described in U.S. Pat. No. 4,161,288, are commonly used to dispense household cleaning products such as liquid detergents or polishes. Finger pumps as described in EP 682 568A, are often used to dispense cosmetic products such as hand lotions or perfumes.

However, known pumps typically comprise 10 to 15 components and therefore associated tooling, forming and assembly costs are relatively high; yet often with modest operating characteristics.

SUMMARY OF THE INVENTION

It is therefore an aim of preferred embodiments of the present invention to provide a pump which can be manually actuated, which has good operating characteristics in dispensing flowable materials and which is of relatively simple construction. By “flowable materials” we mean in this specification any non-gaseous material which can be caused to flow, using the present invention, including, without limitation, liquids and viscous materials such as creams and lotions.

Further aims and advantages of preferred embodiments of the present invention include ease of manufacture, fast priming, resistance to bottle panelling, and cleanliness after use, as will become apparent with reference to the description that follows.

According to a first aspect of the present invention there is provided a dispensing device comprising a source of a flowable material, a pump for dispensing the flowable material and means for supplying the flowable material to the pump, the pump comprising a hollow piston adapted to move within a cylinder such that the piston and cylinder together define a chamber of variable volume, and a valve controlling the supply of flowable material into the chamber, wherein during a first phase of operation of the pump the piston moves outwardly within the cylinder and the chamber expands, while the valve permits the supply of flowable material into the chamber and during a second, subsequent, phase of operation of the pump the piston moves inwardly within the cylinder so that the chamber reduces, while the valve prohibits the supply of flowable material to or from the chamber, with the result that flowable material drawn into the chamber during the first phase is pressurised.

The valve preferably has one part which is comprised by or carried with the cylinder and another part which is comprised by or carried with the piston.

The valve may comprise an inner cylinder co-operating with a movable inlet valve member which when located within the inner cylinder seals it against passage of flowable material therethrough. Suitably the inlet valve member is outside the inner cylinder during one part of the pumping cycle and within the inner cylinder during the remainder of the pumping cycle.

Preferably the pump comprises an outlet valve, preferably an outlet pre-compression valve. By this we mean a valve associated with the outlet, requiring a certain level of force against it, and hence fluid pressure, in order to open and allow the flowable material to escape. By this means the output from the dispensing device can be of desirable form (for example a jet or spray). Preferably the pre-compression valve is designed so that when flowable material is being pumped it is opened by the pressurisation of the flowable material, without mechanical intervention. However during a priming operation when it is air that is being compressed, it is preferably arranged not to be opened by the air. Rather, mechanical intervention is required to open the pre-compression valve during this phase, and allow the air out. The mechanical intervention may be the action of a part carried by a body which comprises the cylinder, and the pre-compression valve member may be a part of the body which comprises the piston.

According to another aspect of the invention there is provided a pump comprising an opening sealable by an outlet valve arranged to be opened by mechanical means acting on a valve member during priming and by hydraulic pressure acting on the valve member as flowable material is delivered from the pump during a delivery stroke, the valve member being resiliently biased to seal the opening when the pump is at rest.

According to a further aspect of the invention there is provided a pump comprising an opening sealable by an outlet valve arranged to be opened by hydraulic pressure acting on a valve member as flowable material is delivered from the pump during a delivery stroke, the valve member being resiliently biased to close the valve when at rest, wherein the pump further comprises mechanical means arranged to open, or hold open, the valve at the start of a return stroke such that air is drawn through the opening into the pump.

According to yet another aspect of the invention there is provided a pump suitable for delivering flowable material from a container, wherein the pump comprises venting means for selectively opening the container to the atmosphere during part of a pumping cycle and sealing means which seals the container from the atmosphere during the remaining part of the pumping cycle, the latter part including when the pump is at rest.

Preferably the pump terminates in an outlet control cap which is rotatable between an operative, flowable material-emitting position and an at-rest, flowable material-blocking position.

The aspects defined above may be used individually or in any combination; In embodiments in which a non-viscous (ie “thin” or “watery”) liquid is to be pumped any of them may be used and preferred embodiments use all of them. In embodiments in which a viscous material is to be pumped, for example a lotion or cream, the first and second embodiments, at least, may be used.

Suitably a pump in accordance with the present invention comprises a body defining the cylinder, with the body preferably comprising, formed as one part with the cylinder, one or more of the following:

- a valve, or part thereof, controlling inflow of flowable material into the pump;
- a said mechanical means to assist priming of the pump and/or to permit suck back of some air through the outlet aperture into the pump;
- an actuator for the pump (for example a handle or lever);
- a shroud for the pump; and
- an integrally moulded spring.

Suitably a pump in accordance with the present invention Comprises a body defining the piston, with the body preferably comprising, formed as one part with the piston, one or more of the following:

- a valve or part thereof controlling inflow of the material into the pump;
- an outlet control cap having "on" and "off" conditions (which may suitably be moulded as part of the body which comprises a cylinder, and removed therefrom, and attached to the body comprising the piston, for example by snap-fitting); and
- said outlet valve.

Alternatively such parts which may be integrally formed as a part of the body which comprises the cylinder or piston can be made separately therefrom, and joined thereto.

The dispensing device may include a dip tube allowing flowable material to be drawn into the pump.

As noted above, in certain embodiments the outlet control cap can be moulded with one of the other parts, for example with the body which includes the cylinder, and "snapped" out of it. It may then be attached, preferably in a snap-fit manner, to the body defining the piston. In a preferred such embodiment the control cap is snapped out of the actuator, itself preferably moulded as part of the body.

Preferably a pump defined herein is part of a dispensing device which is designed to be hand-held.

In accordance with a further aspects of the present invention there is provided a method of dispensing a flowable material comprising the use of a dispensing device or pump of any aspect previously defined.

For a better understanding of the invention, and to show how embodiments of the same may be carried into effect, reference will now be made, by way of example, to the accompanying diagrammatic drawings. For ease of explanation parts are shown separate which may otherwise be moulded as a single component. In the drawings:

DETAILED DESCRIPTION OF THE IVENTION

Figure 1:
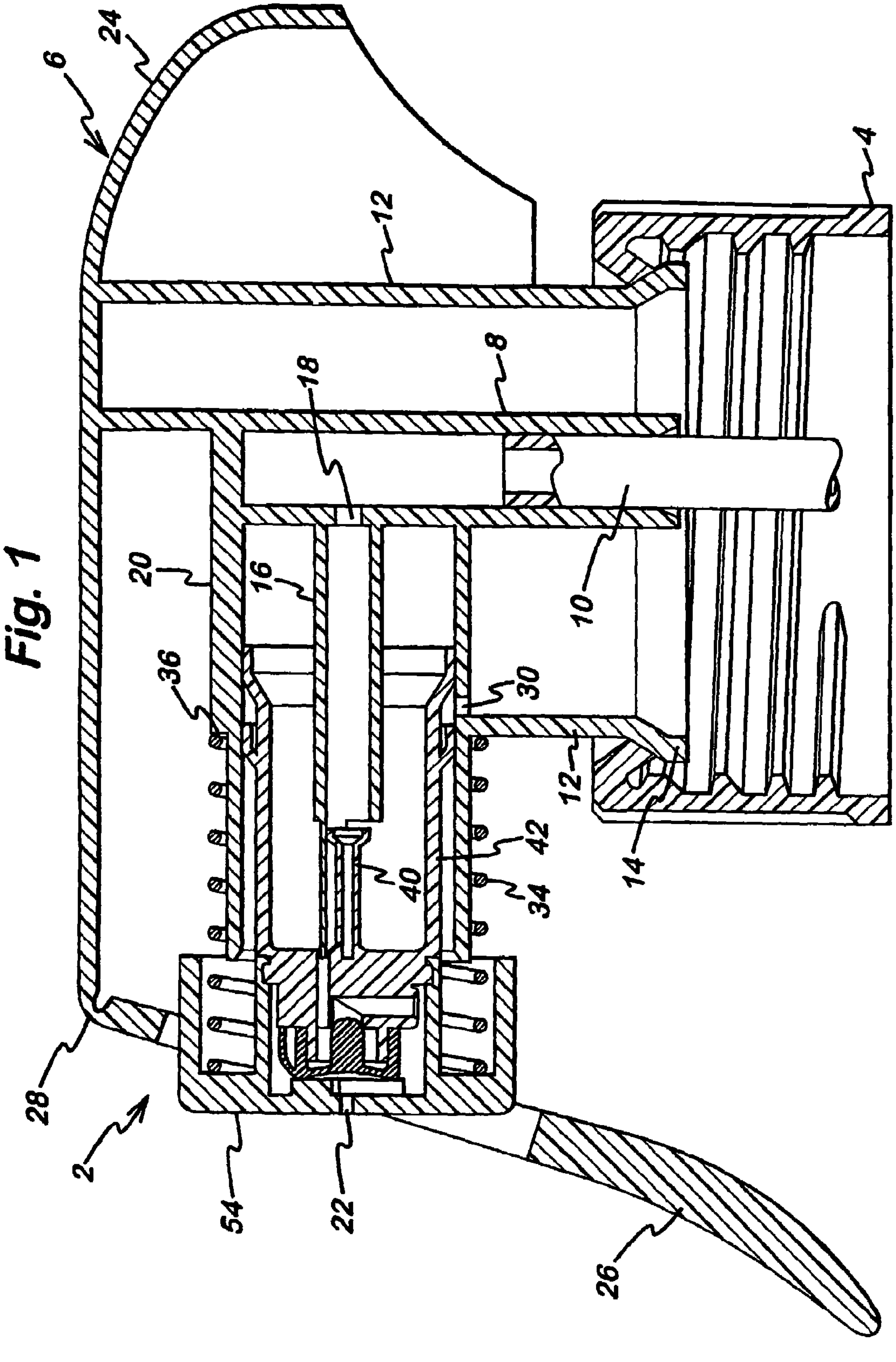
FIG. 1 is a side sectional view of a pump according to a first embodiment of the present invention for mounting on the neck of a bottle containing a thin liquid to be dispensed.

FIG. 1 shows a pump 2 according to a first aspect of the present invention ready for use, and in the rest position. The pump assembly 2 is for mounting on the threaded neck of a bottle (not shown) by means of a threaded retaining ring 4. The bottle contains a liquid, namely an aqueous, non-viscous, cleaning liquid.

The body 6 of the pump is a single plastics moulding providing:

- an inner upright cylinder 8 which snugly receives the upper end of a dip tube 10;
- an outer upright cylinder 12 having a flared lower end 14 which is trapped against the bottle neck by the retaining ring 4, to secure the pump firmly on the neck of the bottle;
- an inner horizontal cylinder 16 communicating via an aperture 18 with the inner upright cylinder 8 (and hence with the dip tube 10);
- an outer horizontal cylinder 20 selectively communicating with the inner horizontal cylinder 16 and with an outlet 22 (as will be described in detail);
- a cover wall or shroud 24 covering the four cylinders just described; and
- a trigger lever 26 connected by a flexible moulded-in hinge 28 to the shroud 24.

The second horizontal cylinder surrounds the first horizontal cylinder and, in this embodiment, is longer than it.

Also shown are further features of the body 6 comprising a venting aperture 30 in the wall of the outer cylinder 20, mechanical means in the form of an arcuate finger 32 (see FIGS. 2 and 7) projecting from the end of the inner horizontal cylinder 16, and an abutment for a helical spring 34 (see FIG. 1), the abutment being formed by the frontal portion of the outer upright cylinder 12 and, on the top of the outer cylinder, by a ledge 36.

Figure 2:
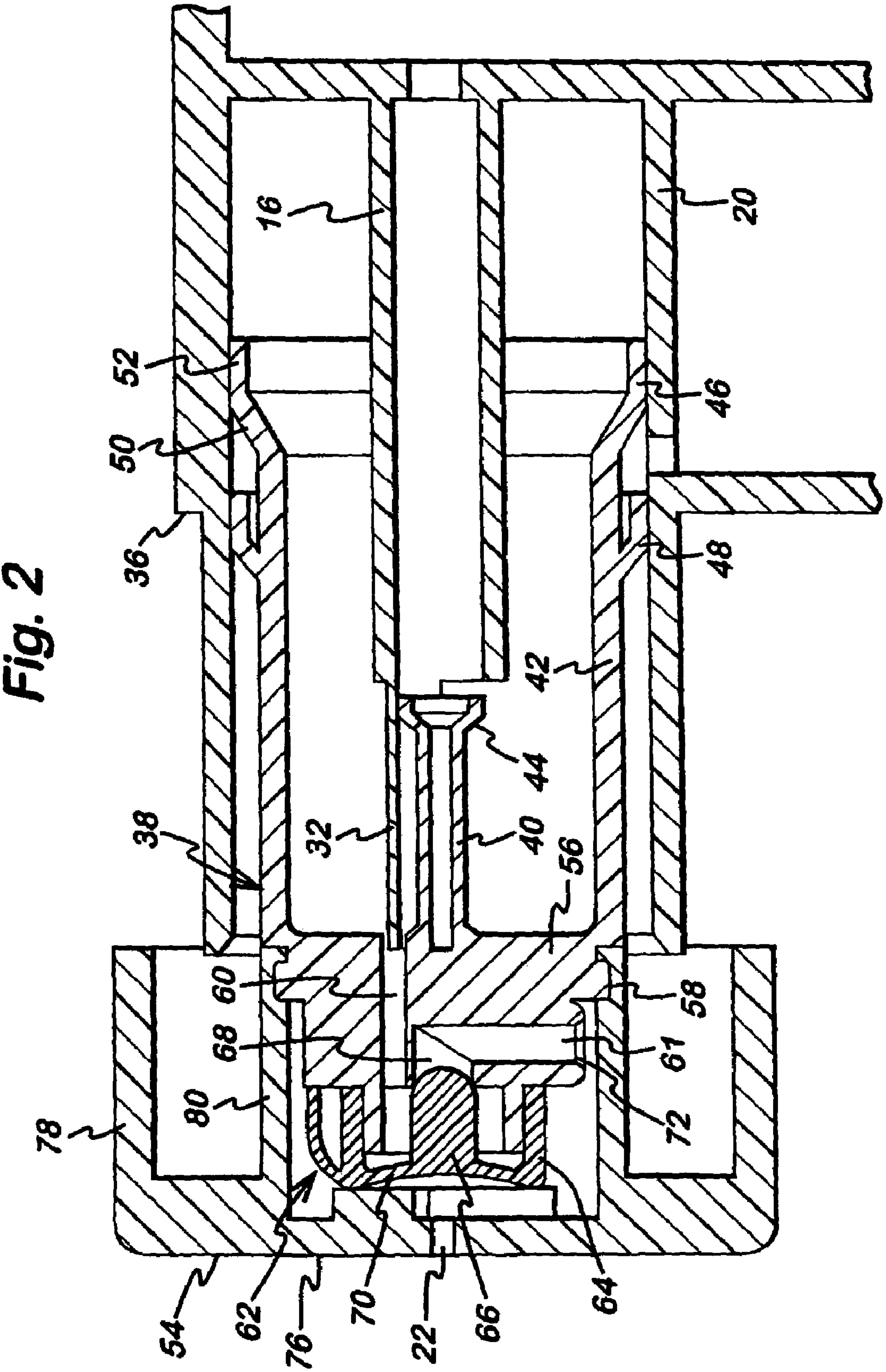
FIG. 2 is a side sectional view of the pump mechanism of the pump of FIG. 1, in a rest position but with an outlet control cap thereof configured for use.

With reference now to FIG. 2, a second part comprises a shuttle 38 having an inlet valve member 40, which in certain positions of the shuttle makes a sealing fit inside the inner horizontal cylinder 16, and, coaxial with it, a piston 42 which at all times makes a sealing fit inside the outer horizontal cylinder 20. The inlet valve member 40 is itself in the shape of a cylinder, and has a widened, flared distal end 44.

The piston has on its outer surface two annular sealing skirts. One sealing skirt 46 forms the termination of the wall of the piston, albeit outwardly flared. The other sealing skirt 48 is spaced a small distance from the sealing skirt 46 and takes the form of a dependent piece projecting outwardly from the outer horizontal piston. Each sealing skirt comprises a portion 50 projecting in an outward, oblique direction directly from the wall of the piston, and a terminal portion 52 which is parallel to the main wall of the piston.

The shuttle is made of a material with some flexibility, for example polyethylene, or a thermoplastic elastomer.

Preferably the shuttle is made of a more flexible material than the body. The body may typically be made of polypropylene.

It will be seen from the drawings that an outlet control cap 54 is mounted on the shuttle, but that it is of separate manufacture. In fact it is moulded as part of the body 6 within the lever 26, and is snapped out of it, and snap-fitted on the shuttle 38.

The valve member 40 and outer piston 42 both face towards the aperture 18 of the body 6, being carried on one side of a thick transverse wall 56 of the shuttle 38. This wall terminates in an annular outer formation 58 which is domed in cross-section, as shown in FIGS. 2 to 6. The outlet control cap 54 is snap-fitted onto this annular formation, the cap 54 having a correspondingly-shaped annular recess formed therein. Formed longitudinally through the transverse wall 56 is a port 60. Port 60 is in the form of an arcuate slit which accommodates the arcuate finger 32 sufficiently loosely that liquid can flow through the slit even when the arcuate finger is in the slit (see FIG. 7). Liquid drawn from the bottle has to pass through the port 60. The port 60 leads to an outlet valve 62 which leads in turn to the outlet aperture 22 formed in the cap 54 (to be described in more detail later).

The inner valve member, the outer piston, the transverse wall 56 and the valve member 62 and its associated parts may all be moulded in one operation from a single material. However in another embodiment it may be desirable to mould the valve member 64 of the valve from a separate material and to join it to the rest of the shuttle 38, in order that the valve member 64 has different flexibility characteristics.

The valve member 64 comprises a plug 66 resiliently biased against a valve opening 68 by its own diaphragm 70; all forming part of the shuttle 38.

The outlet control cap 54 may be turned relative to the shuttle. Downstream of the valve opening 68 there is a bore 61 leading to an aperture 72. As can be discerned in FIGS. 2 to 6 the aperture 72 has a raised annular rim 74 around it. Downstream of the aperture 72 there is a route for liquid through a standard swirl chamber, so that the liquid issues through outlet aperture 22 as a fine spray.

The cap 54 has a transverse wall 76 at the end of the pump, breached only by the outlet aperture 22. Depending from this wall are an outer cylindrical wall 78 and an inner cylindrical wall 80. These cylindrical walls are coaxial and are of the same length. It is in the inner cylindrical wall 80 that there is formed the annular recess to receive the annular projection 58 of the transverse wall 56 of the shuttle 38. The valve 62 is located within the inner cylindrical wall 80. To be precise, the valve 62 is located in a de facto chamber bounded by the inner cylindrical wall 80, the transverse wall 56 of the shuttle, and the transverse wall 76 of the cap. The inner and outer cylindrical walls of the cap are coaxial with the inner and outer cylinders of the body 6, but the outer cylindrical wall 78 of the cap overlaps the outer wall of the body by an amount sufficient to accommodate the helical spring 34 (see FIG. 1). The helical spring acts to urge the shuttle and body apart, into the rest position shown in FIGS. 2 and 6. For clarity the helical spring is not shown in FIGS. 2-6.

Figure 5:
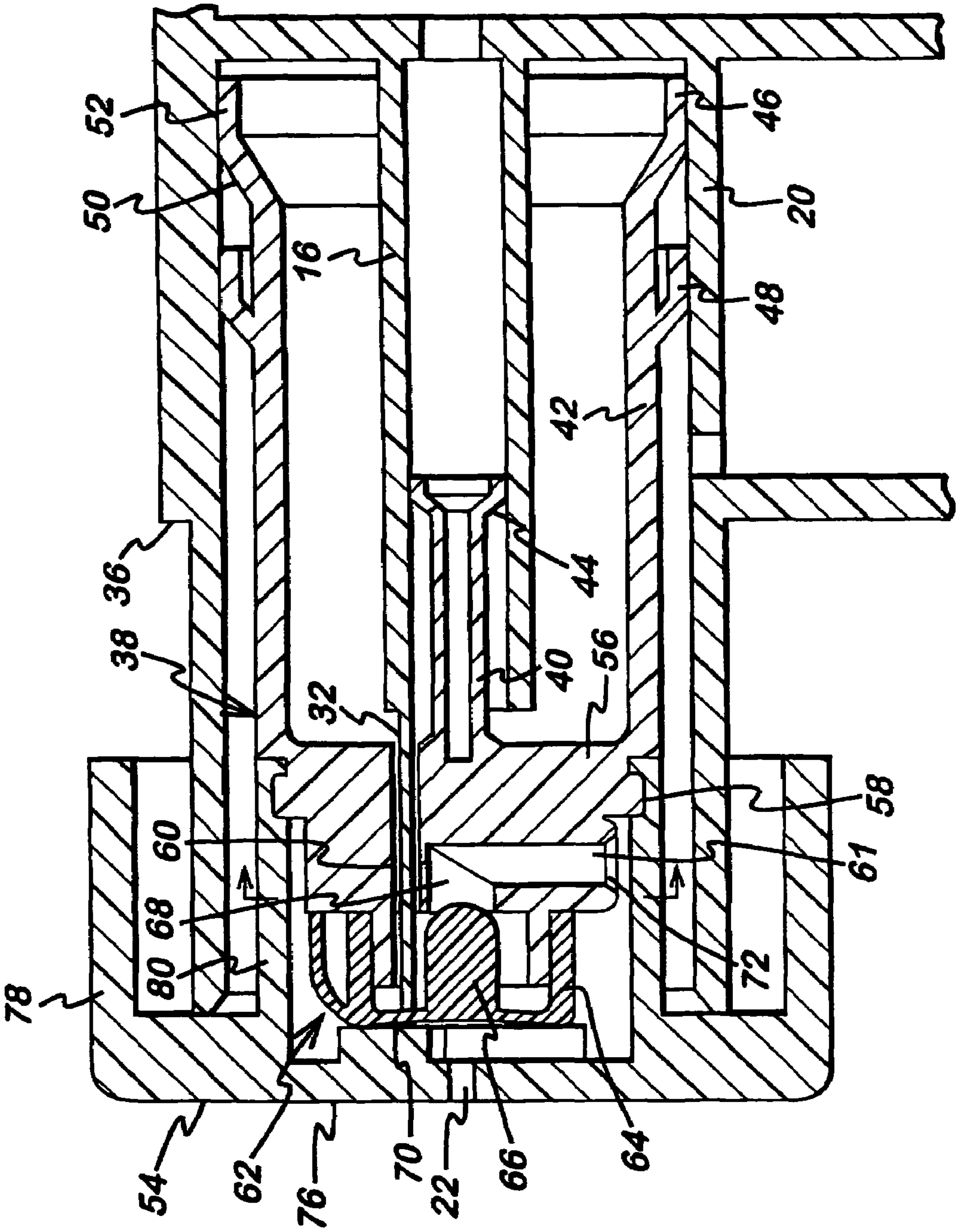
FIG. 5 is a side sectional view of the pump mechanism of FIG. 2 at the end of the delivery stroke.
Figure 6:
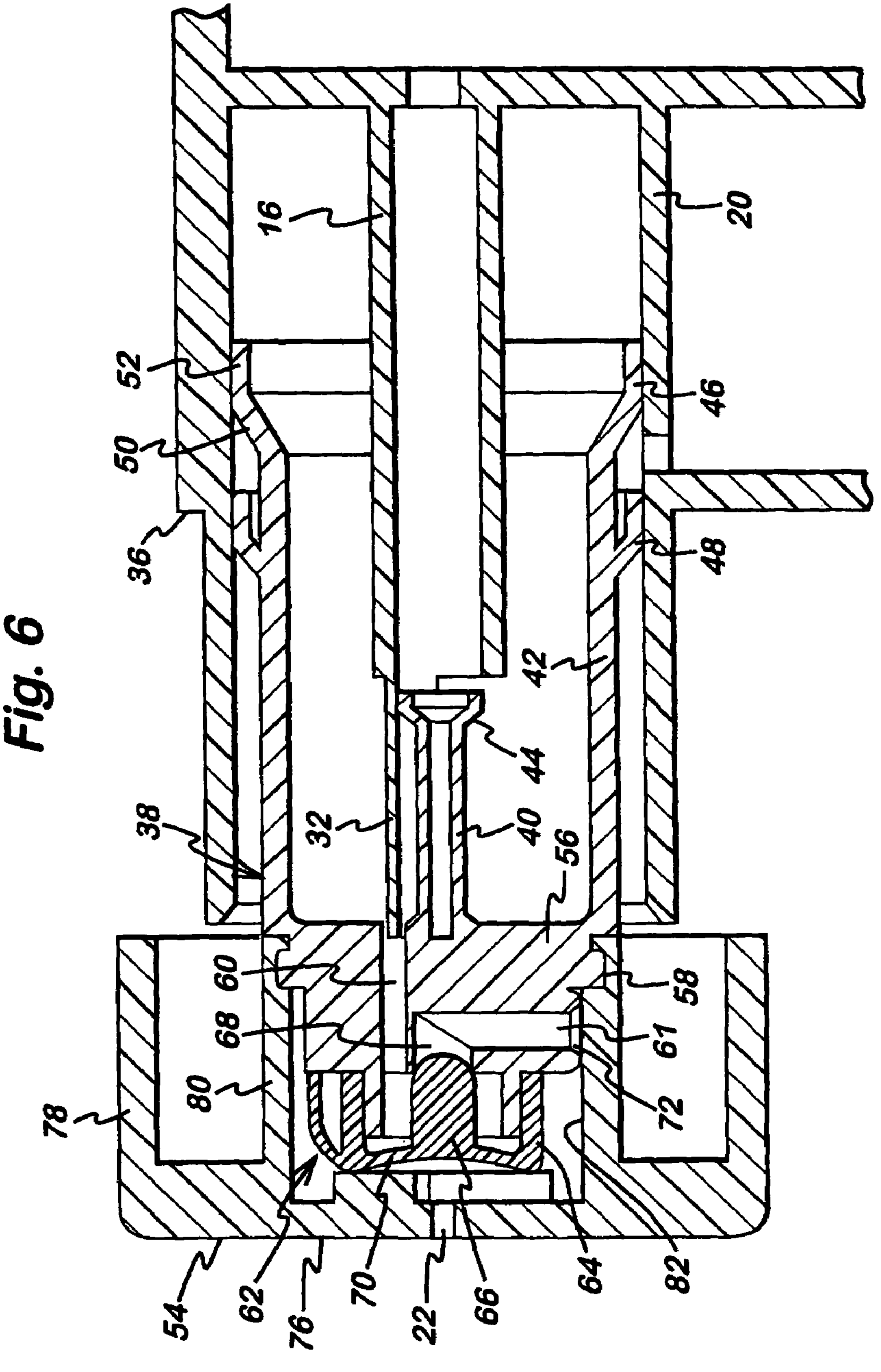
FIG. 6 is a side sectional view of the pump mechanism of FIG. 2 in a rest position with the outlet control cap configured for storage or transportation.
Figure 7:
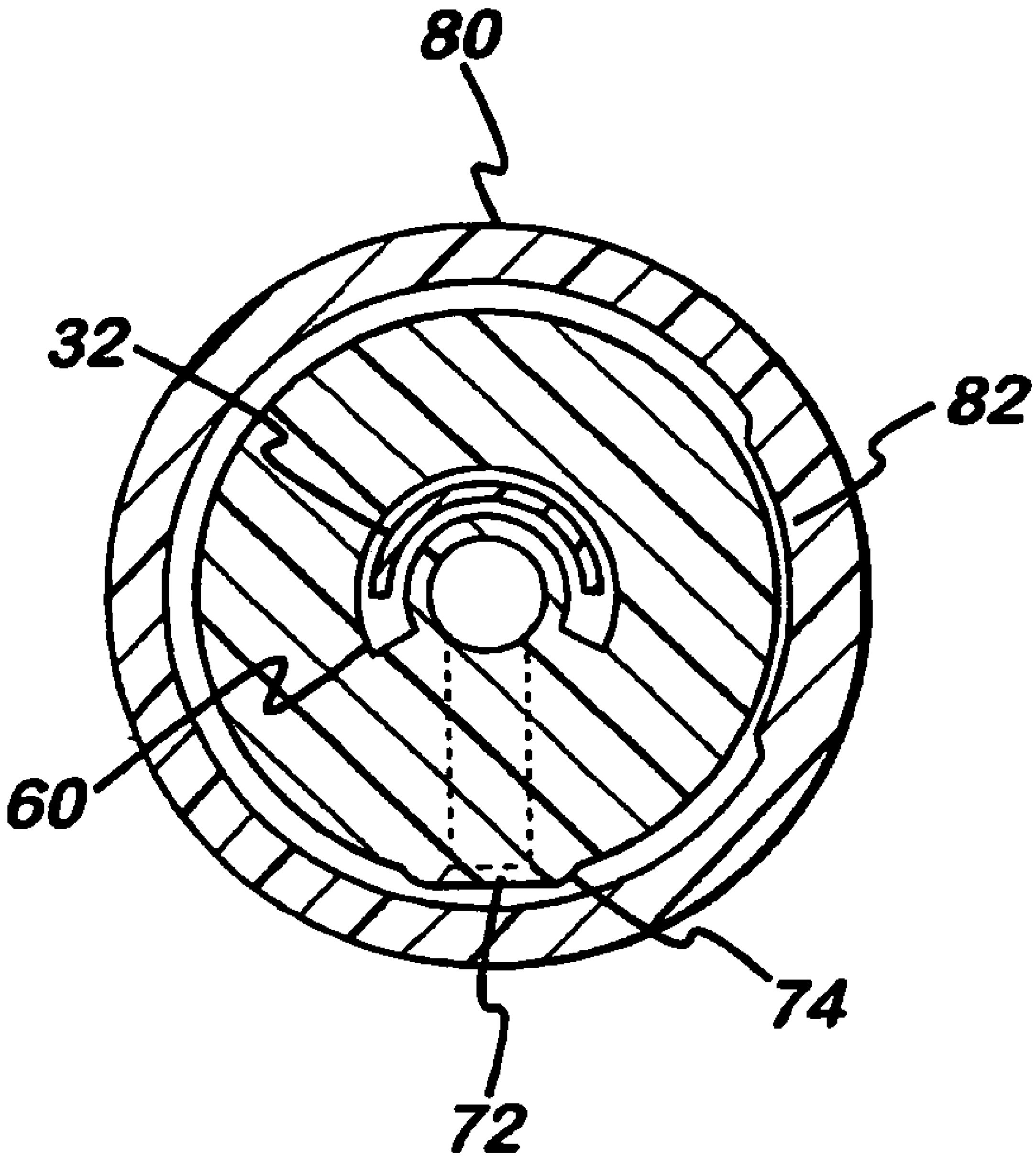
FIG. 7 is a cross sectional view of the zone indicated by arrows in FIG. 5.

The inner cylindrical wall of the cap has, on a quadrant of its inner cylindrical surface, a raised land 82 (see FIGS. 6, 7). It will be noted that in the region of numeral 82 the wall is shown thicker in FIG. 6 than in FIGS. 2 to 5, and that in FIG. 6 it is in contact with the annular rim 74. When the land 82 is in contact with the annular rim 74 around the aperture 72, the cap is in its closed position and liquid cannot be dispensed by the pump. If the cap is turned, by 90° in this embodiment, the land is moved away from its sealing position and liquid can flow through the aperture 72 and to the outlet 22. This is the condition shown in FIGS. 2 to 5 in which it will be seen that there is a discrete gap between the inside surface of the inner cylindrical wall of the cap and the annular rim 74.

In use, depressing the lever 26 by a user causes movement of the cap 54 and shuttle 38 relative to the body 6 against the bias of the spring 34, and subsequent movement of the shuttle 38 back to the rest position, under the bias of the spring 34, causes liquid to be drawn up the dip tube 10, through the aperture 18 thence via the pump, to the outlet 22. Further detail of the operation of the pump 2 will now be given with reference to FIGS. 2 to 6.

Initially, the pump 2 is configured in the rest position as shown in FIG. 6, with the cap in the “off” position.

In this rest position, the inner valve member 40 is located just beyond the extent of the inner horizontal cylinder 16. In this position the venting aperture 30 is located between the sealing skirts 46, 48 of the shuttle 38. The valve 62 is also closed. Accordingly, even if the bottle is shaken or inverted there is no route for liquid to escape.

The first task is to turn the cap to the “on” position shown in FIG. 2, by turning it through 90°. In so doing, the lever couples to two trunnions (not shown) protruding from the outer wall of the cap such that in the “on” position movement of the lever is transferred to the shuttle 38.

At the start of the operation the chambers and channels of the pump 2 are likely to be filled with air. Before the pump 2 can dispense any liquid from the supply within the container it must be primed. Priming involves flushing out the air in the various chambers and channels of the pump 2 so that they are filled with liquid. The pump is primed by a user causing reciprocating movement of the shuttle 38 relative to the body 6 against the bias of the spring 34, and subsequent movement of the shuttle 38 back to the rest position under the bias of the spring 34. It is desired that the priming operation involves a minimum number of strokes of the shuttle 38 before liquid is dispensed from the pump 2. The pump shown is adapted to minimise the number of strokes required for priming, preferably not more than 3 on average, more preferably not more than 2 on average.

Figure 3:
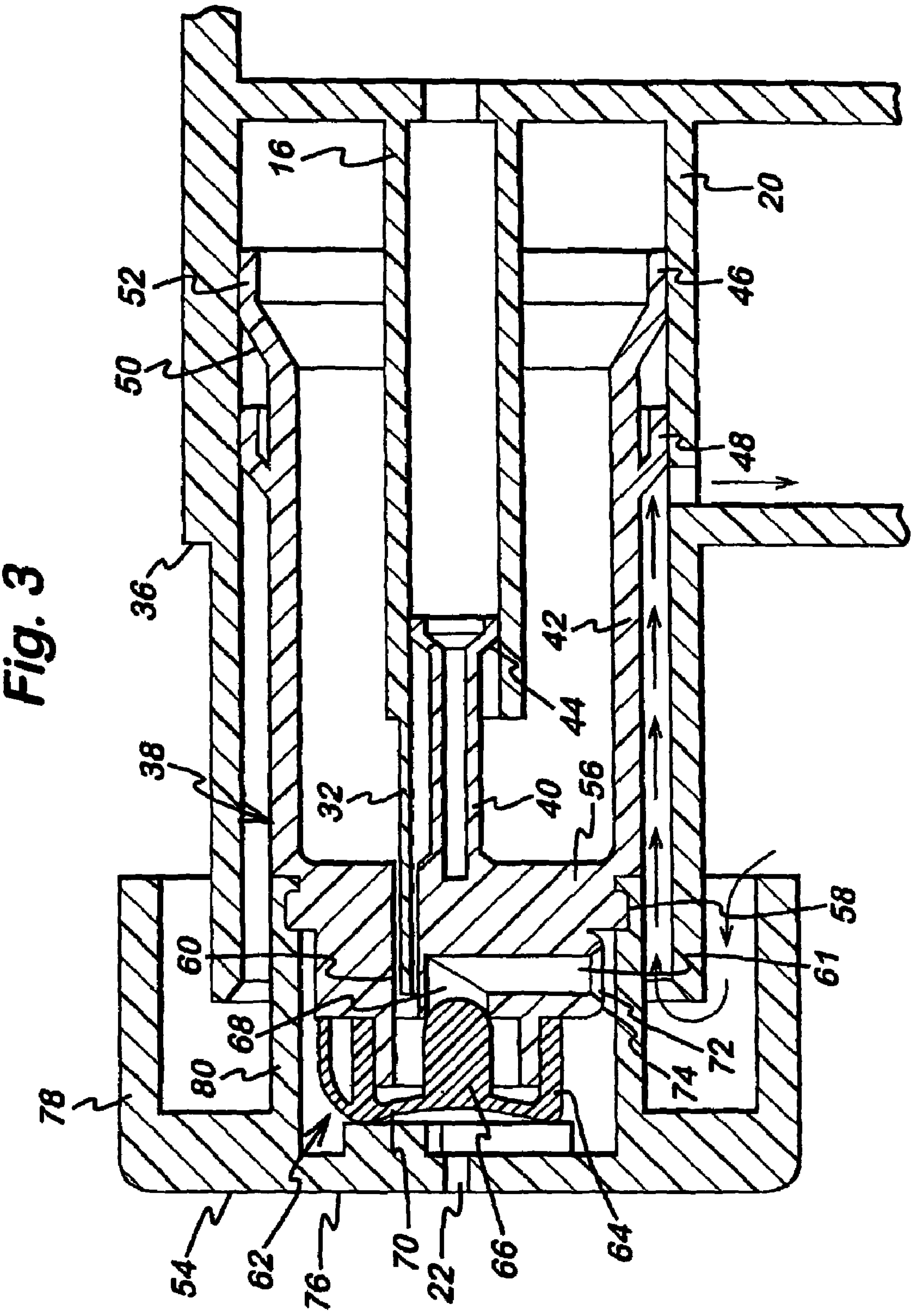
FIG. 3 is a side sectional view of the pump mechanism of FIG. 2 in an intermediate position of the return stroke.
Figure 4:
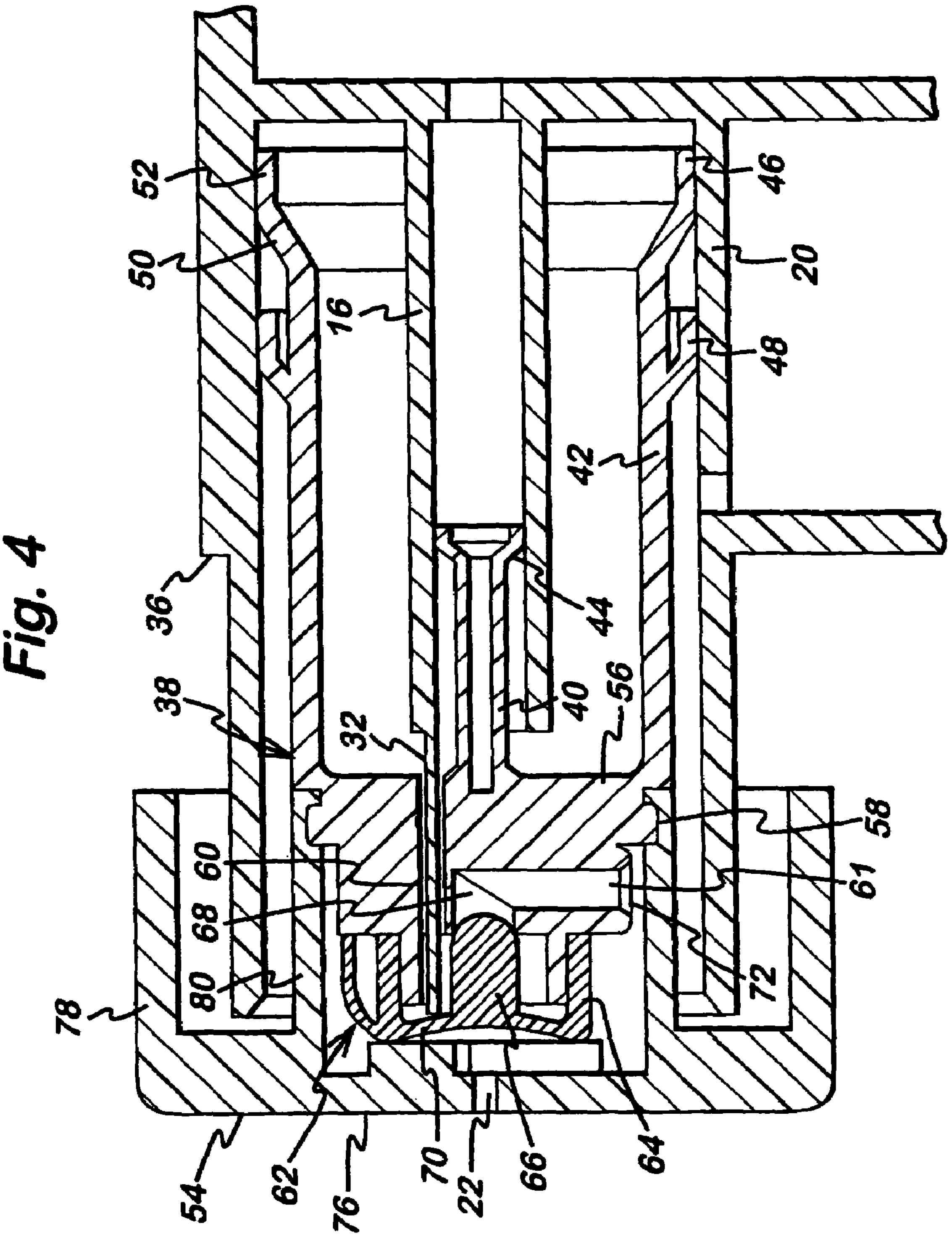
FIG. 4 is a side sectional view of the pump mechanism of FIG. 2 approaching the end of the delivery stroke.

As the shuttle 38 is moved from the rest position of FIG. 2, it assumes the intermediate position shown in FIG. 3. In the intermediate position, the valve member 40 has moved into the inner horizontal cylinder 16, and as a result the outer horizontal cylinder 20 encompasses a closed chamber. The outer piston 42 moves further into the outer horizontal cylinder 20 compressing the air in the closed chamber. The pressure in the closed chamber increases, but sufficient air pressure is not developed to open the valve 62 by forcing the plug 66 away from the valve opening 68 against the bias of the diaphragm 70. Rather, it is opened by the arcuate finger 32 coming into contact with the diaphragm 70, and mechanically lifting the plug 66 from the valve opening 68 against the bias of the diaphragm 70. Opening the outlet valve 62 by mechanical means such as the arcuate finger 32 towards the end of the delivery stroke of the pump 2 allows pressurised air to be evacuated from the outer horizontal cylinder 20 in spite of the bias of the diaphragm 70 tending to close the outlet valve 62 and the relatively high compressibility of air (compared with liquids).

As the shuttle 38 returns towards the rest position from the end of the delivery stroke, pressure within the pump chamber defined between the shuttle and the outer horizontal cylinder decreases, to below atmospheric pressure. This causes a number of significant effects, including the following.

Firstly, as the shuttle 38 first starts to move from the end of the delivery stroke, the outlet valve 62 is still held open by the arcuate finger 32. This momentarily causes suction of air back through the outlet aperture 22. The benefits of this suction will be described later with reference to normal (non-priming) operation of the pump 2. Following disengagement of the arcuate finger 32 from the diaphragm 70 the outlet valve 62 closes.

Secondly, an under-pressure is formed in the outer horizontal cylinder 20.

As the shuttle 38 returns to the rest position the valve member 40 moves beyond the inner cylinder 16, causing liquid to flow through the inner cylinder 16 and into the outer cylinder 20 to relieve the under-pressure conditions developed.

The number of strokes required to prime the pump 2 will depend on the relative dimensions of the cylinders and the dip tube. If the outer cylinder 20 is not primed with liquid following one stroke, further strokes are required. The opening of the outlet valve 62 by the arcuate finger 32 toward the end of the delivery stroke during priming allows air to be fully evacuated from within the outer cylinder 20 in spite of the bias of the diaphragm 70 tending to close the outlet valve 62, thereby maximising the effect of each priming delivery stroke, and consequently reducing the number of priming strokes required for given cylinder and dip tube dimensions. In the absence of the arcuate finger 32, towards the end of each priming delivery stroke the relative compressibility of air means that insufficient pressure may be generated in the outer cylinder 20 to open the outlet valve 62, and consequently air would be retained in the outer cylinder 20 thus reducing the effect of each priming delivery stroke.

Once the pump 2 has been primed, it is ready to dispense liquid. Dispensing operation is described below.

Again, the shuttle 38 is moved from the rest position, to the intermediate position shown in FIG. 3. In the intermediate position, the valve member 40 has moved within the inner cylinder 16. The positioning of the valve member 40 within the inner cylinder 16 makes the outer cylinder 20 a closed volume. The outer piston 42 moves into the outer cylinder 20, compressing the liquid in the closed volume. As the liquid is effectively incompressible, the pressure in the closed volume rapidly increases, causing the outlet valve 62 to open under hydraulic pressure on the diaphragm 70 of the outlet valve 62. Liquid passes through the port 61, through the aperture 72, through an insert or swirl configuration to break up the liquid into spray and to impart swirl, and is dispensed from the outlet 22.

On the other hand if the user does not apply sufficient force the valve 62 will not be opened by the hydraulic pressure. The user must exert a threshold force to develop sufficient hydraulic pressure to open the valve. This ensures that when the flowable material issues it does so in a desired form (for example, as a fine spray, in this embodiment).

The characteristics of the cap 54 and/or aperture can be varied to produce a spray or other desired dispensing conditions as appropriate to the liquid being dispensed.

FIG. 3 also shows that the venting aperture 30 is now open, which means that the small underpressure in the bottle is relieved.

The arrangement eliminates or reduces "panelling" of the bottle. Only towards the rest position, when the venting is not needed, is the venting means closed, by being covered by the shuttle's sealing skirts 46, 48 to each side, and by the portion of the piston 42 which connects them (as shown in FIG. 2).

Liquid is dispensed from the outlet aperture 22 until the end of the delivery stroke. FIG. 5 shows the pump 2 at the end of the delivery stroke. At this position movement is terminated by the abutment of the end of the outer cylinder of the body against the underside of the transverse wall 76 of the cap.

As the shuttle 38 returns toward the rest position from the end of the delivery stroke, the pressure within the shuttle 38 is lost. This causes a number of effects.

First, as the shuttle 38 first starts to move from the end of the delivery stroke, the outlet valve 62 is now maintained open by the arcuate finger 32. This causes suction of some air back through the outlet aperture 22 and the channels which feed it. This drives liquid which is left in the outlet aperture 22 and the adjacent channels inwardly, reducing drips and preventing blockage from any non-volatile residue which could otherwise dry out in the channels.

Following disengagement of the arcuate finger 32 from the diaphragm 70 the outlet valve 62 closes.

Second, liquid is drawn into the first cylinder 16 through the inlet aperture 18.

Third, an under-pressure is formed in the chamber defined by the shuttle 38 and outer cylinder 20.

As the shuttle 38 returns to the rest position the inlet valve member 40 moves beyond the inner cylinder 16, allowing the liquid in the inner cylinder 16 to be drawn into the outer cylinder 20 by the pressure difference between them. Thus the outer cylinder 20 remains primed with liquid, and the pump 2 is ready to dispense liquid from the outlet aperture 22 upon further actuation by a user.

The pumps referred to can be incorporated into a trigger mechanism. This format is especially suitable for dispensing household cleaning products, including "thin" liquids such as liquid detergents, polishes, and horticultural products such as insecticides, fungicides and foliar feeds; and also thicker liquids, for example liquid soaps, shampoos, hair conditioners, creams, lotions, sauces, syrups; being, for example, cleaning products, cosmetics products, healthcare products (for example skincare treatments) and food products.

Alternatively, the pumps can be incorporated into a finger pump mechanism. This format is especially suitable for dispensing "thick" cosmetic and beauty liquid products such as hand lotions and moisturizing creams. Alternatively the pumps can be incorporated into a finger spray mechanism. This format is especially suitable for dispensing "thin" cosmetic and beauty products such as perfumes. In the latter embodiments the liquid would not issue from the end face of the cap, as shown in FIGS. 1 to 6, but from an outlet aperture in a different location; for example from the side of the cap or through a spout extending from the cap. The end face would be left free to be pressed upon.

Although the pumps referred to have been described as comprising cylinders, it is clear to the skilled person that this does not limit the scope of the invention to embodiments comprising cylinders of circular cross section. Any suitable cross section such as square, rectangular or elliptical can be used providing the associated piston/valve member has a complementary cross-section, and the respective parts cooperate. Likewise, references to horizontal and vertical are merely made for clarity and understanding, and not to be taken as limiting.

Although the invention has been described in detail with reference to a lever-actuated pump (commonly known as a trigger pump) the inventive developments described herein could be used in a pump with a different actuation mechanism, for example a push-down mechanism, as used for a finger spray or a lotion dispenser, the latter suitably having a downwardly-facing outlet displaced from the container proper by a stem. Flowable materials typically dispensed by a finger spray include perfumes and air fresheners, provided in the container as a liquid and dispensed as a fine spray. Flowable materials typically dispensed by a press-down dispenser include relatively viscous liquids, for example liquid soaps, shampoos, hair conditioners, creams, lotions, sauces, syrups; being, for example, cleaning products, cosmetics products, healthcare products (for example skincare treatments) and food products.

What is claimed is:

1. A dispensing device comprising a source of a flowable material, a pump for dispensing the flowable material and means for supplying the flowable material to the pump, the pump comprising a hollow piston adapted to move within a cylinder such that the piston and cylinder together define a chamber of variable volume, and an inlet valve controlling the supply of flowable material into the chamber, wherein during a first phase of operation of the pump the piston moves outwardly within the cylinder and the chamber expands, while the inlet valve permits the supply of flowable material into the chamber; and during a second, subsequent, phase of operation of the pump the piston moves inwardly within the cylinder so that the chamber reduces, while the inlet valve prohibits the supply of flowable material to or from the chamber, with the result that flowable material drawn into the chamber during the first phase is pressurized, the pump further comprising an opening sealable by an outlet valve which is arranged to be opened by hydraulic pressure acting on the outlet valve as flowable material is delivered from the pump during a delivery stroke, wherein a body defining the piston of the pump comprises an outlet control cap having on and off conditions and also comprises said outlet valve associated with said outlet control cap, and by the fact that the pump comprises mechanical means which are part of a body defining the cylinder of the pump and which are constantly accommodated at least partly inside a port of the body defining the piston, such that the mechanical means, first, are arranged to open, in a priming phase, the outlet valve during the end of a delivery stroke and to hold open the outlet valve at the start of a return stroke as well as, second, allow that the outlet control cap is rotatable relative to the body defining the piston.

2. A dispensing device according to claim 1 wherein the inlet valve has one part which is comprised by or carried with the cylinder and another part which is comprised by or carried with the piston.

3. A dispensing device according to claim 1 wherein the inlet valve comprises an inner cylinder co-operating with a movable inlet valve member which when located within the inner cylinder seals it against passage of flowable material therethrough.

4. A dispensing device according to claim 1 wherein the body defining the cylinder comprises one or more of the following:

(a) the inlet valve, or part thereof, controlling inflow of flowable material into the pump;

(b) an actuator for the pump;

(c) a shroud for the pump; and (d) an integrally moulded spring.

5. A dispensing device as claimed in claim 1 having a pre-compression outlet valve or a dispensing outlet valve.

6. A dispensing device according to claim 1, wherein the pump comprises venting means for selectively opening a container to the atmosphere during part of a pumping cycle and sealing means which seals the container from the atmosphere during the remaining part of the pumping cycle, the latter part including when the pump is at rest.

7. A dispensing device according to claim 1, wherein the body defining the piston comprises the inlet valve, or part thereof, controlling inflow of the flowable material into the pump.

* * * * *

UNITED STATES PATENT AND TRADEMARK OFFICE
CERTIFICATE OF CORRECTION

PATENT NO. : 7,597,218 B2
APPLICATION NO. : 10/543993
DATED : October 6, 2009
INVENTOR(S) : Donald Jan Workum It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this

Twenty-eighth Day of September, 2010

David J. Kappos
*Director of the United States Patent and Trademark Office*